United States Patent
Chang et al.

(10) Patent No.: US 12,330,462 B2
(45) Date of Patent: Jun. 17, 2025

(54) VEHICLE-HEIGHT CONTROL SYSTEM OF INDEPENDENT CORNER MODULE

(71) Applicants: Hyundai Motor Company, Seoul (KR); Kia Corporation, Seoul (KR)

(72) Inventors: Sehyun Chang, Suwon-Si (KR); Sang Woo Hwang, Seoul (KR); Min Jun Kim, Busan (KR); Youngil Sohn, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 241 days.

(21) Appl. No.: 18/127,543

(22) Filed: Mar. 28, 2023

(65) Prior Publication Data
US 2024/0092134 A1    Mar. 21, 2024

(30) Foreign Application Priority Data

Sep. 16, 2022 (KR) .................. 10-2022-0117151

(51) Int. Cl.
*B60G 17/015* (2006.01)
*B60G 17/016* (2006.01)
*B60G 17/02* (2006.01)

(52) U.S. Cl.
CPC ..... *B60G 17/0157* (2013.01); *B60G 17/0162* (2013.01); *B60G 17/025* (2013.01);
(Continued)

(58) Field of Classification Search
CPC ........... B60G 17/0157; B60G 17/0162; B60G 17/025; B60G 2202/13–134; B60G 2202/42; B60G 2202/442; B60G 2204/419; B60G 2204/62; B60G 2400/0511; B60G 2400/25; B60G 2500/20; B60G 2500/30
See application file for complete search history.

(56) References Cited

U.S. PATENT DOCUMENTS

2014/0131971 A1    5/2014 Hou
2020/0189345 A1    6/2020 Plante et al.

FOREIGN PATENT DOCUMENTS

DE    102020113865 A1 *  6/2021
EP    0712743 A       5/1996
(Continued)

OTHER PUBLICATIONS

Zandbergen, P; DE 10 2020 113 865, machine translation. (Year: 2021).*

*Primary Examiner* — Mark L. Greene
(74) *Attorney, Agent, or Firm* — Morgan, Lewis & Bockius LLP

(57) ABSTRACT

A vehicle-height control system of an independent corner module, includes a suspension link connected to a wheel and configured to be rotated according to upward-downward displace of the wheel, a gear unit connected to a vehicle body and a rotational center portion of the suspension link and configured to receive a rotation force from the suspension link, a control torsion bar, a first end portion thereof being connected to the gear unit and the second end portion thereof being connected to a torsion variation unit, the torsion variation unit applying a drive force to adjust a height of the control torsion bar and to maintain the adjusted height, and a controller connected to the torsion variation unit and adjusting the height of the control torsion bar.

20 Claims, 6 Drawing Sheets

(52) U.S. Cl.
    CPC ...... *B60G 2202/13* (2013.01); *B60G 2202/42*
        (2013.01); *B60G 2202/442* (2013.01); *B60G*
        *2204/419* (2013.01); *B60G 2204/62* (2013.01);
        *B60G 2400/0511* (2013.01); *B60G 2400/25*
        (2013.01); *B60G 2500/20* (2013.01); *B60G*
        *2500/30* (2013.01)

(56) References Cited

FOREIGN PATENT DOCUMENTS

| | | |
|---|---|---|
| JP | 1993-044620 U | 6/1993 |
| JP | 2002-205523 A | 7/2002 |
| JP | 2007-030574 A | 2/2007 |
| KR | 2000-0055777 A | 9/2000 |
| KR | 10-1339218 B | 1/2014 |
| KR | 2018-0082701 A | 7/2018 |

\* cited by examiner

SURFACE CONTACT

VEHICLE-HEIGHT CONTROL SYSTEM OF INDEPENDENT CORNER MODULE

CROSS-REFERENCE TO RELATED APPLICATION

The present application claims priority to Korean Patent Application No. 10-2022-0117151 filed on Sep. 16, 2022, the entire contents of which is incorporated herein for all purposes by this reference.

BACKGROUND OF THE PRESENT DISCLOSURE

Field of the Present Disclosure

The present disclosure relates to a vehicle-height control system of an independent corner module, and more particularly, to a vehicle-height control system of an independent corner module, the system configured for controlling a vehicle height and roll behavior by controlling torsional stiffness of a separate control torsion bar according to a load state of a vehicle.

Description of Related Art

Usually, suspensions, each being configured with an elastic spring apparatus and an absorptive damper apparatus, are used in vehicles, conveyances, and transportation means to maintain a ground clearance from the ground to a vehicle, and to support a weight of the vehicle, and to absorb shock received from the ground.

The suspension has the limitation in depending on only a change in damping force thereof to reduce the risk of accident, such as vehicle overturning due to abrupt rolling motion that occurs by sudden steering while a vehicle with the center of gravity located at a relatively high point, such as a large-sized bus or a double decker, travels. Therefore, there is required a method to adjust a vehicle height by lowering a vehicle body In contrast, while a vehicle with a low vehicle height travels, the bottom of a body or a bumper thereof may come into contact with a speed bump on a road. Therefore, a vehicle-height adjustment apparatus of adjusting the vehicle height is provided in the vehicle with the low vehicle height. The vehicle-height adjustment apparatus adjusts the vehicle height by driving a motor. However, generally, electric power continues to be supplied to the motor to prevent back drive after the vehicle-height adjustment apparatus adjusts the vehicle height. Thus, an amount of energy consumed by the vehicle may be increased. Therefore, there is a need to alleviate the present problem.

The vehicle-height adjustment apparatus in the related art adjusts the vehicle height in a range of load conditions, such as curb weight and gross vehicle weight (GVW), according to a load state of a vehicle occupant or luggage. That is, a change in adjustable payload is limited. Today, there are various types of vehicles. A purpose-built vehicle (hereinafter referred to as a "PBV") is one thereof. In a case where a business box (main body) is attached in the forward-backward direction to a transporter to which an apparatus is removably attached, among PBVs, there is a significant difference in payload, which has to be supported, between when the transporter is present independently and when the business box is mounted in the transporter. Therefore, there is a demand for technology capable of controlling the vehicle height according to load states of a broader range of vehicles.

While the vehicle travels, in addition to upward-downward bouncing of the vehicle body, bouncing, such as rolling, pitching, and yawing, occurs. The suspension needs to flexibly absorb the present bouncing to improve stability of steering, as well as riding comfortability. A phenomenon in which the vehicle body rolls from side to side is referred to as rolling. The occurrence of the rolling may cause deforming of the vehicle body, as well as reducing of riding comfortability and traveling stability of the vehicle. For the present reason, the suspension of the vehicle includes an apparatus of preventing the rolling of the vehicle body.

As an exemplary embodiment of the present disclosure, a stabilizer bar provided to prevent the vehicle from rolling from side to side and to maintain a state of balance of the vehicle body controls roll behavior of the vehicle using torsion that occurs due to a phase difference between a bump of a left/right wheel of the vehicle and a rebound stroke. However, a roll control apparatus of the vehicle in the related art has the limitation in controlling roll behavior occurring by active movement of the vehicle, because the stabilizer bar characteristically controls the roll behavior of the vehicle. Consequently, there occurs a problem in that the stability of the vehicle and the riding comfortability cannot both be satisfied only with the stabilizer bar having fixed stiffness.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle-height control system of an independent corner module, the system configured for controlling a vehicle height and roll behavior by controlling torsional stiffness of a separate control torsion bar according to a load state of a vehicle.

Another object of the present disclosure is to provide a vehicle-height control system of an independent corner module, the system configured for controlling roll by controlling a relative torsional angle of a control torsion bar.

The present disclosure is not limited to the above-mentioned objects. An object other than the above-mentioned objects would be clearly understood from the following description of embodiments of the present disclosure. Furthermore, the objects of the present disclosure will be accomplished by limitations recited in claims or a combination thereof.

To accomplish the above-mentioned objects, according to an aspect of the present disclosure, there is provided a vehicle-height control system of an independent corner module, the system including: a suspension link, a first end portion thereof being connected to a wheel and a second end portion thereof being rotatably coupled to a vehicle body; a stationary torsion bar, a first end portion thereof being fixed to the vehicle body and a second end portion thereof being gear-engaged with the second end portion of the suspension link; a control torsion bar, a first end portion thereof being gear-engaged with the second end portion of the stationary torsion bar; and a torsion variation unit removably connected to a second end portion of the control torsion bar and configured to control torsional stiffness of the control torsion bar.

In the vehicle-height control system, the torsion variation unit may include a control motor configured to adjust an amount of rotation of the control torsion bar; a clutch unit configured to keep the control torsion bat rotated; and a synchronizer configured to be removably connected to the second end portion of the control torsion bar.

The vehicle-height control system may further include a controller configured to be connected to the torsion variation unit.

In the vehicle-height control system, when receiving a signal which is below a preset lower limit value, from a sensor unit, the controller may cause the synchronizer to be connected to the control torsion bar and may control the torsion variation unit to adjust a vehicle height.

In the vehicle-height control system, when receiving a signal which is above a preset upper limit value, from the sensor unit, the controller may cause the synchronizer to be connected to the control torsion bar and may control the torsion variation unit to adjust the vehicle height.

In the vehicle-height control system, when receiving a signal that varies between the preset lower and upper limit values, from the sensor unit, the controller may cause the synchronizer to be disconnected from the control torsion bar.

In the vehicle-height control system, when receiving from the sensor unit the signal that has an absolute value of a difference between respective vehicle heights of left and right wheels which is higher than a preset value, the controller may perform control so that the vehicle height is adjusted.

In the vehicle-height control system, in a step of adjusting the vehicle height, when the synchronizer is connected to the control torsion bar, the controller may be configured to control the control motor to form a torsional angle of the control torsion bar.

In the vehicle-height control system, in the step of adjusting the vehicle height, when the synchronizer is not connected to the control torsion bar, for connection, the controller is configured to adjust an angle of the control torsion bar through the control motor. Moreover, when it is determined that the synchronizer is connected to the control torsion bars, the controller may be configured to control the control motor to make the torsional angle of the control torsion bar.

According to another aspect of the present disclosure, there is provided a vehicle-height control system of an independent corner module, the system including: a suspension link, a first end portion thereof being connected to a wheel and a second end portion thereof being rotatably coupled to a vehicle body; a stationary torsion bar, a first end portion thereof being fixed to the vehicle body and a second end portion thereof being gear-engaged with the second end portion of the suspension link; a control torsion bar, a first end portion thereof being gear-engaged with the second end portion of the stationary torsion bar; and a torsion variation unit removably connected to a second end portion of the control torsion bar and configured to control torsional stiffness of the control torsion bar, wherein the suspension link and the control torsion bar are formed in a vertical direction.

According to the above-mentioned aspects of the present disclosure, the following effects may be achieved with constituent elements, a combination thereof, and an application-based relationship therebetween that will be described below.

The vehicle height may be controlled by adjusting the torsional stiffness of the separate control torsional bar according to a load state of a vehicle. Thus, the vehicle-height control system of the independent corner module is provided which is configured for flexibly controlling the vehicle height when there is a significant difference in load.

Furthermore, roll of the vehicle may be controlled by controlling a relative torsional angle of the control torsion bar. Accordingly, a suspension state of the vehicle body that varies according to a traveling state of the vehicle may be adjusted. Thus, the effect of improving traveling stability and riding comfortability of the vehicle at the same time may be achieved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
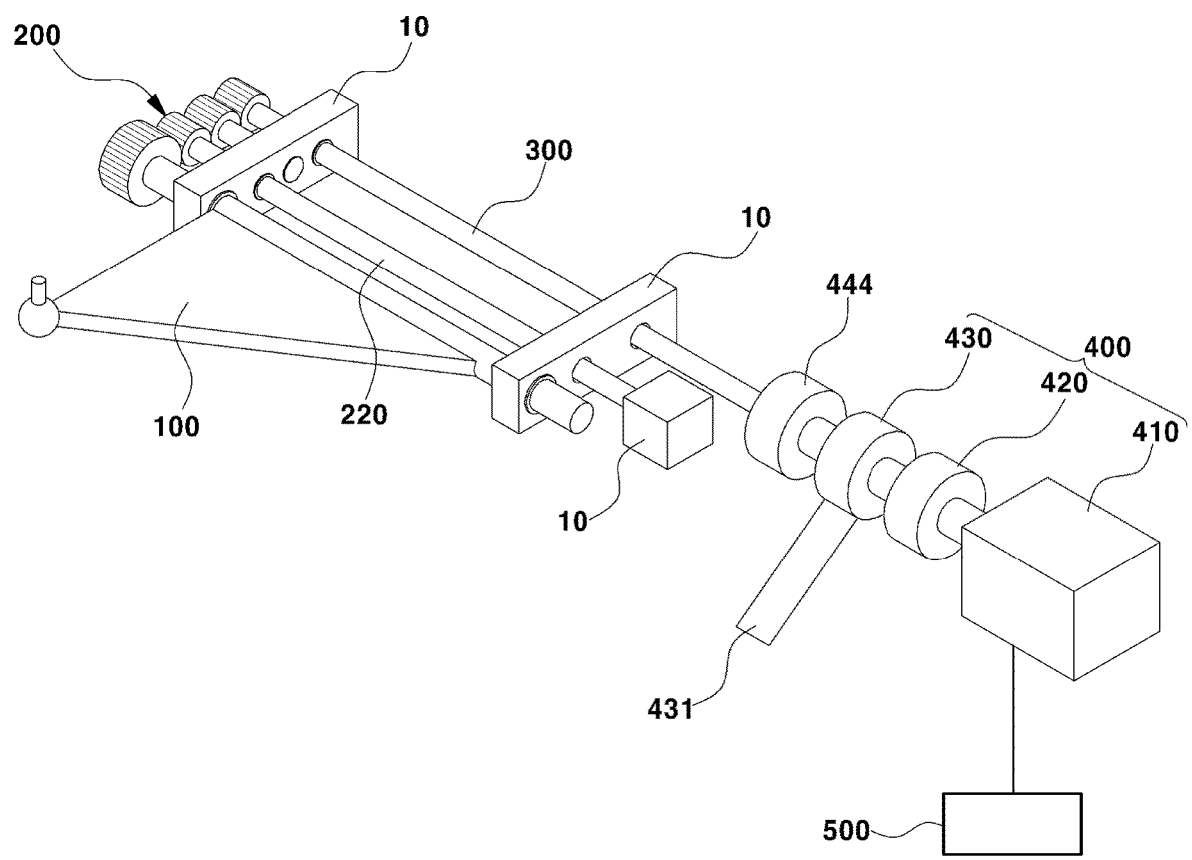
FIG. 1 is a perspective view exemplarily illustrating a vehicle-height control system of an independent corner module according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Embodiments of the present disclosure will be described in more detail below with reference to the accompanying drawings. The exemplary embodiments of the present disclosure may be modified in various forms, and the scope of the present disclosure may not be interpreted as being limited to the following embodiments. The exemplary embodiments are described in sufficient detail to enable a person of ordinary skill in the art to make and use the present disclosure.

The term "module," "unit," or the like, which is used throughout the specification, means an individual component that performs at least one function or operation and may be realized as a hardware component or a combination of hardware components.

Furthermore, throughout the present specification, when a constituent element is "over" a different constituent element, this means that a third constituent element may be positioned therebetween, and when a constituent element is "on the top of" a different constituent element, this means that a constituent element is vertically in contact with an upper surface of a different constituent element. Furthermore, throughout the present specification, when a constituent element is "under" a different constituent element, this means that a third component may be positioned therebetween, and when a constituent element is "on the bottom of" a different constituent element, this means that a constituent element is vertically in contact with a lower surface of a different constituent element.

Furthermore, reference numerals in association with steps are used for convenience in description. The reference numerals are not intended to be used to describe the order of the steps. Unless otherwise definitely specified in context, the steps may be performed in a different order than they are stated.

Furthermore, in the exemplary embodiments of the present disclosure, one wheel of a vehicle is described. Wheels of a multi-wheeled vehicle may each be independently driven.

Furthermore, in the exemplary embodiments of the present disclosure, a "vehicle height" may mean a distance between the center portion of the wheel and a vehicle body 10.

Figure 2:
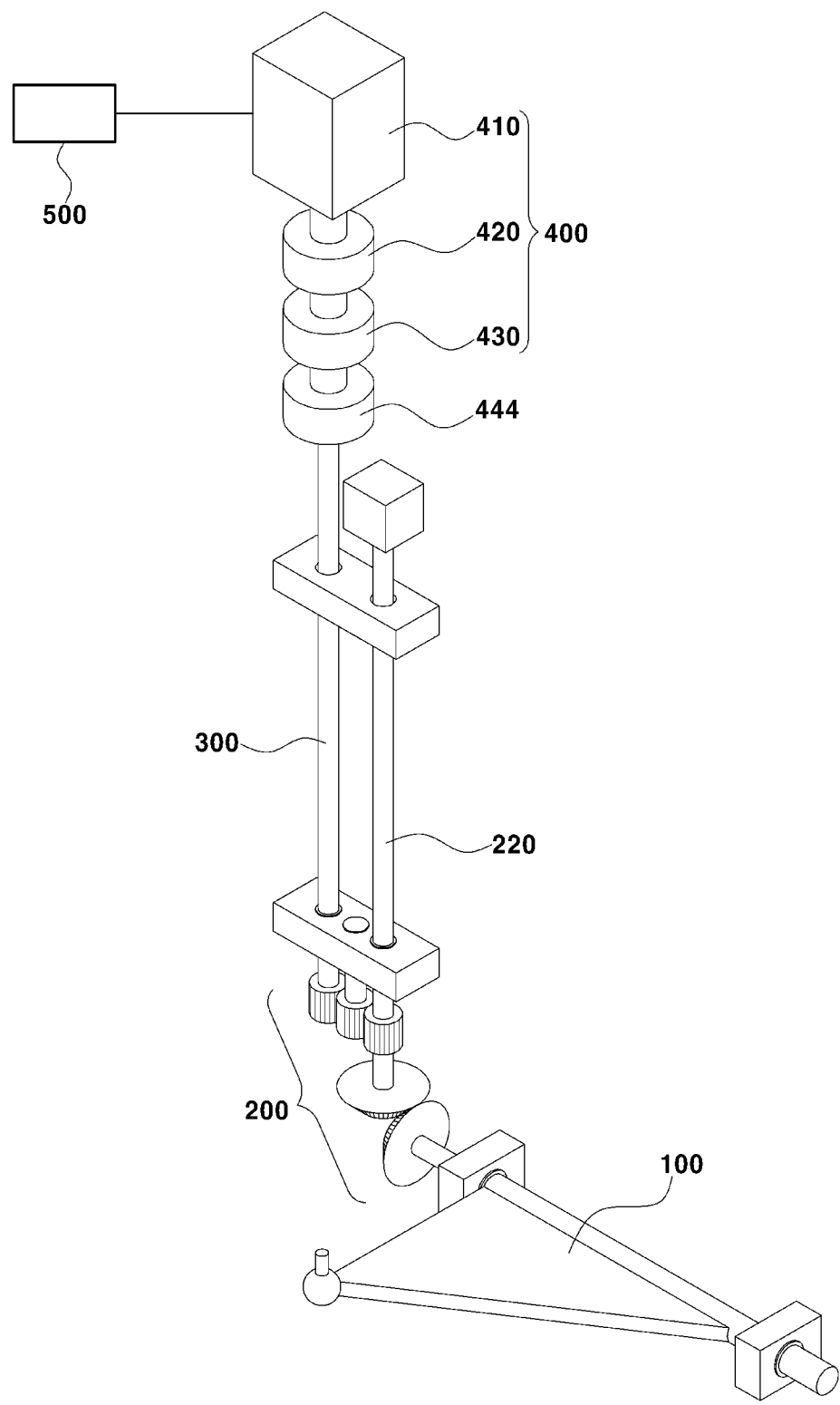
FIG. 2 is a perspective view exemplarily illustrating a vehicle-height control system of an independent corner module according to various exemplary embodiments of the present disclosure.

FIG. 1 is a perspective view exemplarily illustrating a vehicle-height control system of an independent corner module according to various exemplary embodiments of the present disclosure. FIG. 2 is a perspective view exemplarily illustrating a vehicle-height control system of an independent corner module according to various exemplary embodiments of the present disclosure.

With reference to FIG. 1 and FIG. 2, the vehicle-height control system of the independent corner module according to the various exemplary embodiments of the present disclosure may include a suspension link 100, a gear unit 200, a control torsion bar 300 which is connected to a torsion variation unit 400, and a controller 500. The suspension link 100 may be configured to be connected to a wheel. First end portion of the suspension link 100 may be connected to the wheel, and the second end portion thereof may be rotatably coupled to the vehicle body 10. The suspension link 100 may be configured to be rotated according to upward-downward displacement of the wheel and thus to apply a rotation force to the gear unit 200. The gear unit 200 may be configured to rotate the suspension link 100 in an upward-downward direction with a drive force applied from a control motor 410 to the control torsion bar 300 and thus to apply wheel displacement in a heightwise direction thereof.

The gear unit 200 may be configured to be connected to the vehicle body 10 and a rotational center portion of the suspension link 100. The gear unit 200 may be connected to the rotational center portion of the suspension link 100 and may be provided with the rotation force from the suspension link 100 and the control torsion bar 300.

Furthermore, the gear unit 200 is configured to transfer a rotation force of the suspension link 100 to the stationary torsion bar 220 and the control torsion bar 300. The stationary torsion bar 220 and the control torsion bar 300 may be configured to be disposed in a widthwise direction of the vehicle as illustrated in FIG. 1 and may be configured to be disposed in a direction vertical to the vehicle as illustrated in FIG. 2. That is, the suspension link 100 and the control torsion bar 300 may be configured to be positioned in the vertical direction.

Moreover, the gear unit 200 is configured to transfer relative torsion of both end portions of the control torsion bar 300 to the suspension link 100 through the gear unit 200. That is, the gear unit 200 is fastened to the suspension link 100 and the control torsion bar 300 and is configured to transfer the rotation force applied from the suspension link 100 and the control torsion bar 300.

The control torsion bar 300 is configured to adjust a relative torsion angle of first end portion and the second end portion of the control torsion bar 300 with the drive force applied from the control motor 410. Moreover, the torsion variation unit 400 may include a synchronizer 430 which is configured so that the control torsion bar 300 and the control motor 410 are selectively fastened to apply an amount of rotation to the second end portion of control torsion bar 300.

First end portion of the stationary torsion bar 220 may be fixed to the vehicle body 10, and the second end portion thereof may be gear-engaged with the second end portion of the suspension link 100, with the gear unit 200 in therebetween. The stationary torsion bar 220 which is fastened to the vehicle body 10 may be set to have torsional elasticity, considering the vehicle height in an empty state of the vehicle. Furthermore, the stationary torsion bar 220 may be configured to adjust the vehicle height with the torsional electricity which is formed between first end portion of the stationary torsion bar 220 which is fixed to the vehicle body 10 and the second end portion thereof which is fastened to the gear unit 200.

The stationary torsion bar 220 may be configured to correspond to rotation of the suspension link 100 connected to the wheel. The stationary torsion bar 220 may be configured to be rotated by a gear connection unit connected to the rotational center portion of the suspension link 100. Furthermore, the stationary torsion bar 220 may be configured such that, with rotational torque applied from the suspension link 100, the second end portion of the stationary torsion bar 220 is relatively torsional with respect to first end portion of the stationary torsion bar 220 and that the vehicle height is adjusted by adjusting a height of the suspension link 100. The stationary torsion bar 220 may be configured so that the height of the suspension link 100 is adjusted by transferring the rotational torque, applied due to a torsional angle of the control torsion bar 300, to the suspension link 100.

Furthermore, the control torsion bar 300 may be configured such that, in a case where the vehicle height that varies with a weight of the vehicle is above a preset upper limit value or is below a preset lower limit value, the vehicle height is adjusted. That is, the controller 500 receives the vehicle height measured through a sensor unit. In a case where the vehicle height is above the upper limit value which is stored in the controller 500 or is below the lower limit value stored therein, the controller 500 rotates the control motor 410 in one selected direction and thus causes both end portions of the control torsion bar 300 to be twisted with respect to each other by the torsional angle, rotating the suspension link 100. In the present manner, the controller 500 is configured to control the vehicle height so that varies between the upper limit value and the lower limit value.

The control torsion bar 300 may be configured so that first end portion thereof is gear-engaged with the second end portion of the stationary torsion bar 220 and that the second end portion thereof is connected to the torsion variation unit 400. The control torsion bar 300 may be configured to adjust the vehicle height in a case where the weight of the vehicle is greatly increased and thus where the vehicle height is much decreased due to deformation of the stationary torsion bar 220. The torsion variation unit 400 may be configured to adjust torsional stiffness of the control torsion bar 300 and to apply the drive force to maintain the adjusted torsional stiffness. The torsion variation unit 400 may be configured to be connected to the controller 500 and thus to apply the drive force to the control torsion bar 300 by being supplied with a control signal from the controller 500. The controller 500 may be configured to be connected to the torsion variation unit 400 and thus to adjust the torsional stiffness of the control torsion bar 300. The controller 500 may communicate with the torsion variation unit 400 to adjust a relative torsional angle between first end portion and the second end portion of the control torsion bar 300.

The torsion variation unit 400 may include the control motor 410, a clutch unit 420, and the synchronizer 430. The control motor 410 may be configured to adjust the amount of rotation of the control torsion bar 300. The control motor 410 may be configured to be connected to the control torsion bar 300 and thus to selectively apply a rotational drive force to the control torsion bar 300. The control motor 410 may be configured to selectively apply the rotational drive force to the control torsion bar 300 through the synchronizer 430. The synchronizer 430 may be connected to the control torsion bar 300 so that the control motor 410 adjusts the torsional angle of the control torsion bar 300. The control torsion bar 300 may be configured to be freely rotated in a state of not being connected to the control motor 410 through the synchronizer 430 and thus so that the torsional elasticity does not occur. That is, the synchronizer 430 is configured so that the control motor 410 and the control torsion bar 300 are possibly selectively connectable to each other so that corresponds to driving of a synchronizer control motor 431. A reducer 444 may be provided adjacent to the synchronizer 430. In the various exemplary embodiments of the present disclosure, the controller 500 is configured to control the synchronizer 430 so that the control motor 410 and the control torsion bar 300 are fastened to each other through the synchronizer 430 in a case where control that causes both end portions of the control torsion bar 300 to be twisted with respect to each other by the torsional angle is performed. The controller 500 is configured to subsequently apply a rotation force of the control motor 410 so that the control torsion bar 300 is twisted by a preset torsional angle.

The clutch unit 420 may be configured so that the control torsion bar 300 is kept rotated. The clutch unit 420 may be configured to keep the control torsion bar 300 twisted with the rotation force applied from the control motor 410 and thus to keep the vehicle height adjusted even in a state where the control motor 410 does not operate.

The control torsion bar 300 may be configured to correspond to rotation of the suspension link 100 connected to the wheel. The control torsion bar 300 may be configured to be in a state of no longer being connected to the control motor 410 to be freely rotated in a case where additional vehicle adjustment is not necessary. That is, unlike the stationary torsion bar 220, the control torsion bar 300 is connected to the torsion variation unit 400 without first end portion thereof being fixed to the vehicle body 10. Thus, the control torsion bar 300 may be configured to be freely rotated according to selective driving of the torsion variation unit 400. The state where the control torsion bar 300 is freely rotated may mean a state where the torsional elasticity does not occur. To the present end, in a case where the control torsion bar 300 does not need to be twisted by the torsional angle, the controller 500 may cause the control torsion bar 300 and the control motor 410 to be disconnected from each other by disconnecting the synchronizer 430.

Before the synchronizer 430 is fastened to the control torsion bar 300, the controller 500 may cause the control motor 410 to be driven so that the synchronizer 430 is positioned where it is possibly fastened to the control torsion bar 300.

Furthermore, the controller 500 is configured to control the control motor 410 so that the control torsion bar 300 has a torsional angle of 0 to keep the synchronizer 430 out of a state of being fastened to the control torsion bar 300. After a torsional force is not applied to the synchronizer 430, the controller 500 is configured to control the control motor 410 so that the synchronizer 430 is disconnected from the control torsion bar 300.

In the various exemplary embodiments of the present disclosure, the controller 500 is configured to unfasten the control motor 410 and the control torsion bar 300 from each other in a case where the torsional angle by which the control torsion bar 300 is caused to be twisted is below a setting value after the control motor 410 and the control torsion bar 300 are fastened to each other through the synchronizer 430. Furthermore, the controller 500 is configured to control the control motor 410 so that the control torsion bar 300 has a torsional angle close to 0 in a case where the control motor 410 and the control torsion bar 300 are not fastened to each other.

The controller 500 is configured to fasten the control torsion bar 300 and the control motor 410 to each other in a case where the vehicle height is controlled through the control torsion bar 300. Therefore, the controller 500 is configured so that the rotation force applied from the control motor 410 is provided so that both end portions of the control torsion bar 300 are twisted with respect to each other by the torsional angle and such that, with the rotation force applied from the control torsion bar 300, the gear unit 200 rotates the suspension link 100 in the heightwise direction thereof.

The control torsion bar 300 may be configured to be rotated by the gear connection unit connected to the rotational center portion of the suspension link 100. The control torsion bar 300 may be configured to be connected to the synchronizer 430 while being freely rotated and thus to adjust the vehicle height with the torsional elasticity occurring in the opposite direction of the rotational toque applied from the suspension link 100. The control torsion bar 300 may be configured to adjust the vehicle height in a case where the vehicle height varying with the weight of the vehicle is above a preset upper limit value or below a preset lower limit value.

Figure 3:
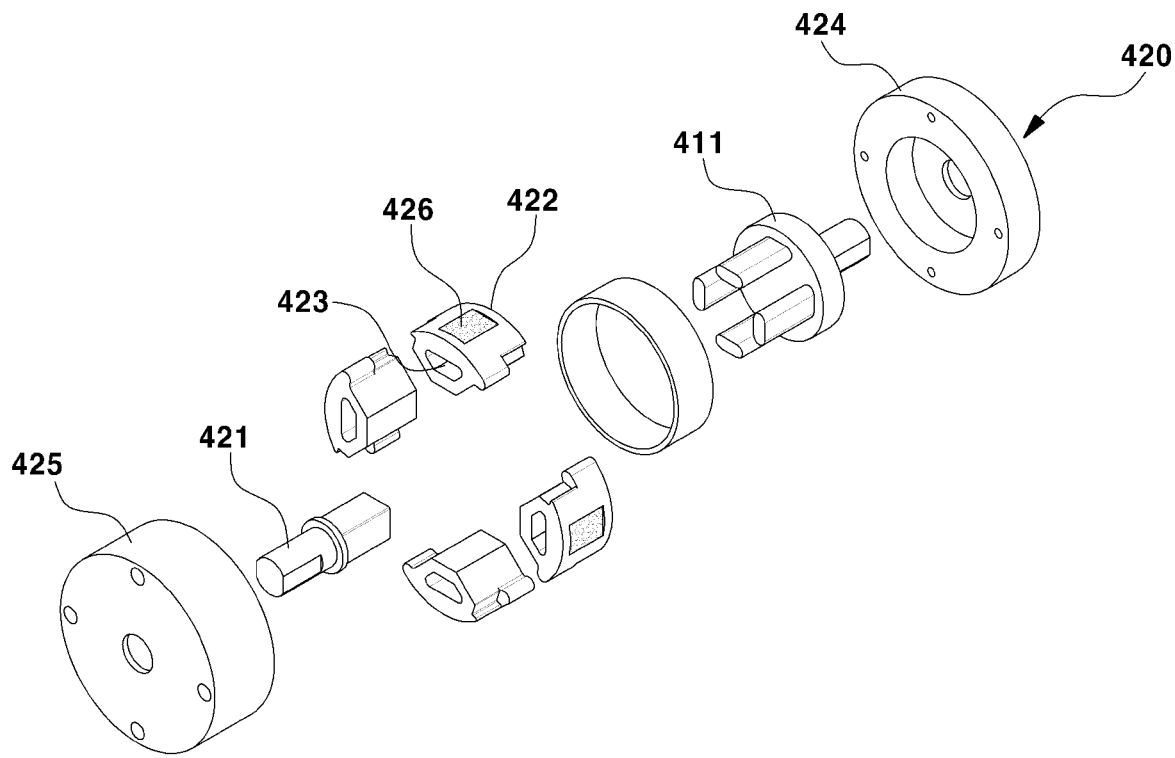
FIG. 3 is a view exemplarily illustrating a detailed configuration of a clutch unit of the vehicle-height control system of the independent corner module according to the various exemplary embodiments.
Figure 4:
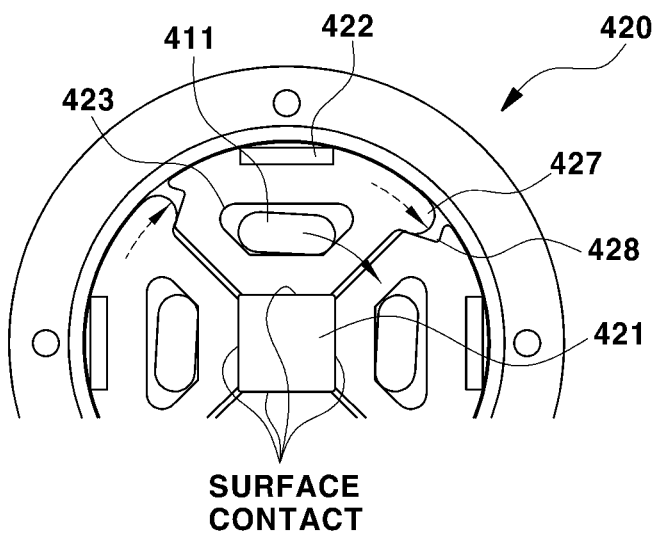
FIG. 4 is a view exemplarily illustrating a driving relationship among components of the clutch unit to which a drive force of a control motor of the vehicle-height control system of the independent corner module is applied.
Figure 5:
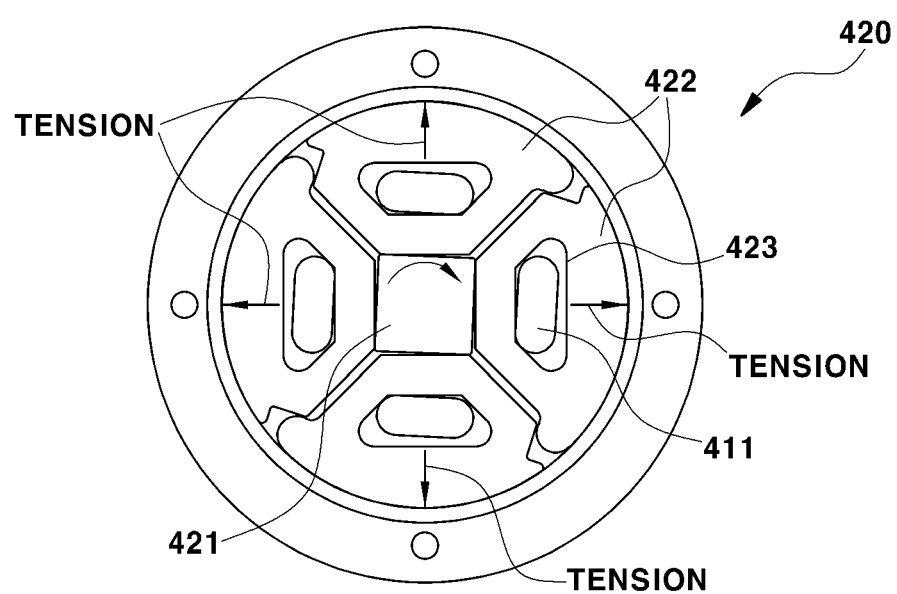
FIG. 5 is a view exemplarily illustrating a driving relationship among components of the clutch unit preventing back drive of the vehicle-height control system of the independent corner module according to the various exemplary embodiments of the present disclosure.

FIG. 3 is a view exemplarily illustrating a detailed configuration of the clutch unit 420 of the vehicle-height control system of the independent corner module according to the various exemplary embodiments of the present disclosure. FIG. 4 is a view exemplarily illustrating a driving relationship among components of the clutch unit 420 to which the drive force of the control motor 410 of the vehicle-height control system of the independent corner module according to the various exemplary embodiments of the present disclosure is applied. FIG. 5 is a view exemplarily illustrating a driving relationship among components the clutch unit 420 preventing back drive of the vehicle-height control system of the independent corner module according to the various exemplary embodiments of the present disclosure.

With reference to FIG. 3, FIG. 4, and FIG. 5, the clutch unit 420 according to an exemplary embodiment of the present disclosure may be configured to be positioned on first end portion of the control motor 410 that is configured to control the vehicle-height control system of the independent corner module and to prevent the back drive. The clutch unit 420 includes a plurality of lockers 422, positioned inside a housing, that are configured to surround a clutch-unit output shaft 421. A control-motor rotation shaft 411, a first end portion of which is inserted into an opening portion 423 positioned in each of the lockers 422, is provided. The clutch-unit output shaft 421 has flat surfaces of which the number is the same as the number of the plurality of lockers 422 that are positioned inside a housing 425. The clutch-unit output shaft 421 according to an exemplary embodiment of the present disclosure may include four flat surfaces that correspond to four lockers 422, respectively. Furthermore, the clutch-unit output shaft 421 is configured so that the flat surfaces thereof are brought into contact with the plurality of adjacent lockers 422 when a rotation force of the control-motor rotation shaft 411 is applied. Therefore, the locker 422 and the clutch-unit output shaft 421 may be configured to be selectively brought into surface-contact with each other.

The control-motor rotation shaft 411 may be configured so that at least first end portion thereof in a longitudinal direction is inserted into the opening portion 423 positioned in each of the lockers 422 and that the second end portion thereof is connected to the control motor 410. The control-motor rotation shaft 411 includes a drive transfer portion that passes through a cover unit 424 so that protrudes out of the cover unit 424. The drive transfer portion is configured to be fastened to the control motor 410 that applies the rotation force and to be rotated with the control motor 410 in a rotation direction thereof.

As illustrated in FIG. 4, the control motor 410 is configured to transfer the drive force with which the control-motor rotation shaft 411 is rotatable. The plurality of lockers are configured to be brought into surface-contact with a flat surface of the clutch-unit output shaft 421 in response to the rotation force of the control-motor rotation shaft 411. Accordingly, the clutch-unit output shaft 421 is configured to be rotated with the drive force transferred to the control-motor rotation shaft 411. The locker 422 may be configured such that, in a case where the rotation force of the control-motor rotation shaft 411 is applied, one inside end portion thereof is brought into contact with the flat surface of the clutch-unit output shaft 421 and is spaced a predetermined distance away from an internal circumferential surface of the housing 425 so that the control-motor rotation shaft 411, the locker 422, and the clutch-unit output shaft 421 are rotated together without any interference with the internal circumferential surface of the housing 425.

A steel member is provided on the internal circumferential surface of the housing 425, and a magnetic body is provided on an external circumferential surface of at least one locker 422. Therefore, in a case where the control motor 410 does not operate and thus the rotation force of the control-motor rotation shaft 411 is no longer applied, the magnetic body on the locker 422 may be moved to a position close to the internal circumferential surface of the housing 425. Furthermore, a brake unit is provided within the housing 425 to be adjacent to the steel member and to be positioned close to the internal circumferential surface of the housing 425. Therefore, with a magnetic force, the locker 422 is moved to a position at which an external circumferential surface of the locker 422 is brought into contact with the brake unit, limiting movement of the control-motor rotation shaft 411.

Furthermore, in a case where a rotation force of the clutch-unit output shaft 421 is applied, the flat surface of the clutch-unit output shaft 421 pushes the plurality of lockers 422 toward a radial direction, fixedly bringing the brake unit positioned on the internal circumferential surface of the housing 425 and the external circumferential surface of the locker 422 into contact with each other. Therefore, the rotation force of the clutch-unit output shaft 421 may be prevented from being transferred to the control-motor rotation shaft 411.

According to an exemplary embodiment of the present disclosure, the clutch unit 420 that prevents the back drive may be configured so that the locker 422 is spaced away from the internal circumferential surface of the housing 425 and that the clutch-unit output shaft 421 is rotated together in accordance with the control-motor rotation shaft 411 which is rotated in a direction which is the same as a direction of the rotation force applied from the control motor 410. Moreover, the clutch unit 420 is configured such that, in a case where the rotation force is no longer applied to the control-motor rotation shaft, the brake unit and the locker 422 are brought into contact with each other, limiting movement of the control-motor rotation shaft and thus preventing a back driving phenomenon.

As illustrated in FIG. 4, in a case where the rotation force of the control motor 410, as a drive unit which is fastened to the drive transfer portion of the control-motor rotation shaft, is applied to the control-motor rotation shaft, rotation transfer portions of the control-motor rotation shaft that are positioned in the opening portions 423, respectively, in the locker 422 are configured to initially press against the opening portions 423, respectively, along a rotation direction of the control-motor rotation shaft.

The pressed opening portions 423 move the plurality of lockers 422, respectively, so that external surfaces of the lockers 422 are spaced away from the brake unit in the housing 425. The plurality of lockers 422 switch to a state of being spaced away from the internal circumferential surface of the housing 425 and thus being rotatable.

The opening portion 423 is formed in the shape of a trapezoid so that a long side thereof is positioned close to an external circumferential surface of the housing 425 and so that a lateral inclined surface thereof in the shape of a trapezoid is pressed against with the rotation force of the rotation transfer portion. The opening portion 423 is formed so that the force is applied to the locker 422 in a direction of a tangent with which the inclined surface of the opening portion 423 and the rotation transfer portion are brought into contact. The rotation force which is applied to the inclined surface of the opening portion 423 is the sum of a force in the vertical direction in which the locker 422 holds the flat surface of the clutch-unit output shaft 421 and a force in the horizontal direction in which the locker 422 is rotated.

Furthermore, as illustrated, according to the various exemplary embodiments of the present disclosure, the rotation transfer portions are configured to be inserted into the opening portions 423, respectively, in four lockers 422 for being positioned therein, to be rotated in the same direction, to be brought into contact with one-side end portions, respectively, of the opening portions 423, and thus to apply the rotation force to the lockers 422, respectively, in the same direction.

Furthermore, a pressing protrusion 427 is provided which is to be positioned on first end portion of a lateral surface of the locker 422 which is close to the internal circumferential surface of the housing 425. Moreover, the locker 422 on which the pressing protrusion 427 is provided has an insertion groove 428 into which the pressing protrusion 427 on the adjacent locker 422 is inserted. The pressing protrusion 427 on the locker 422 is positioned so that intersects the insertion groove 428 in the adjacent locker 422 in the lengthwise direction. The locker 422 on which the pressing protrusion 427 is formed has the insertion groove 428 into which the pressing protrusion 427 formed on the adjacent locker 422 is inserted. The adjacent lockers 422 may be configured to be fastened to each other by the pressing protrusion 427 being inserted into the insertion groove 428.

The pressing protrusions 427 on the plurality of lockers 422 are inserted into the insertion grooves 428, respectively, in the plurality of lockers 422, so that the lockers 422 are fastened to each other. In a case where, due to a magnetic unit 426 positioned on at least one locker 422, the locker 422 is moved closely to the internal circumferential surface of the housing 425, the lockers 422 fastened to each other may be moved together.

Furthermore, in a case where the rotation force of the rotation transfer portion is applied, the pressing protrusion 427 applies a force to the adjacent locker 422, in a direction in which the adjacent lockers 422 are brought into contact with the flat surfaces, respectively, of the clutch-unit output shaft 421. According to the various exemplary embodiments of the present disclosure, in a case where the control-motor rotation shaft 411 is rotated, the four flat surfaces of the clutch-unit output shaft 421 are brought into surface-contact with the lockers 422, respectively.

Therefore, in a case where the rotation transfer portion presses against the opening portions 423 in the locker 422, the pressing protrusion 427 on the locker 422 is inserted into the insertion groove 428 in the adjacent locker 422, being fastened thereto. That is, the pressing protrusion 427 surface-presses against the adjacent insertion groove 428, and the surface-pressed locker 422 moves the adjacent locker 422 in a direction in which the surface-pressed locker 422 is brought into contact with a plurality of parallel flat surfaces of the clutch-unit output shaft 421.

In the present manner, in a case where a rotation shaft of the control motor 410 is rotated, the locker 422 presses against the adjacent locker 422, and thus, a force is applied in a direction which is the same as the rotation direction thereof. Furthermore, the pressing protrusion 427 on the locker 422 is inserted into the insertion groove 428 in the adjacent locker 422 so that the adjacent locker 422 is pressed against and thus that the flat surface of the clutch-unit output shaft 421 is brought into contact with an internal surface of the adjacent locker 422.

As illustrated in FIG. 5, the clutch unit 420 may be configured to prevent the back drive in a case where the rotation force is applied to the clutch-unit output shaft 421 in a state where the rotation force of the rotation shaft of the control motor 410 is not applied. That is, the clutch unit 420 may be configured to keep the vehicle height adjusted in a case where the rotation force is applied to the control torsion bar 300 connected to the clutch-unit output shaft 421 in a state where the control motor 410 does not operate.

In a case where the clutch-unit output shaft 421 is rotated, the clutch unit 420 provides a force so that the locker 422 positioned adjacent to the clutch-unit output shaft 421 is pushed in a radial direction of the housing 425, and the locker 422 is brought into contact with the brake unit positioned on the internal circumferential surface of the housing 425, limiting rotation of the locker 422.

That is, in response to torque produced by the rotation force applied to the clutch-unit output shaft 421, the locker 422 is forced to be moved in the radial direction of the housing 425, and thus the locker 422 and the brake unit are brought into contact with each other. Therefore, a reaction force produced between the brake unit and the locker 422 cancels out the rotation force applied to the clutch-unit output shaft 421, and torque produced from the clutch-unit output shaft 421 is not transferred to the rotation shaft of the control motor 410.

In summary, the clutch unit 420 according to an exemplary embodiment of the present disclosure may be configured so that the rotation shaft of the control motor 410 transfers to the clutch-unit output shaft 421 only the rotation force in one direction that has a same magnitude as the drive force applied from the control motor 410. Moreover, the clutch unit 420 may be configured such that, in a state where the drive force is not applied because the control motor 410 does not operate, when the rotation shaft of the control motor 410 is rotated in a different direction than when rotated by the control motor 410 or where the rotation force from the clutch-unit output shaft 421 is applied to the clutch unit 420, the rotation force is canceled out by the reaction force of the locker 422. With the present configuration, the back drive may be prevented.

Figure 6:
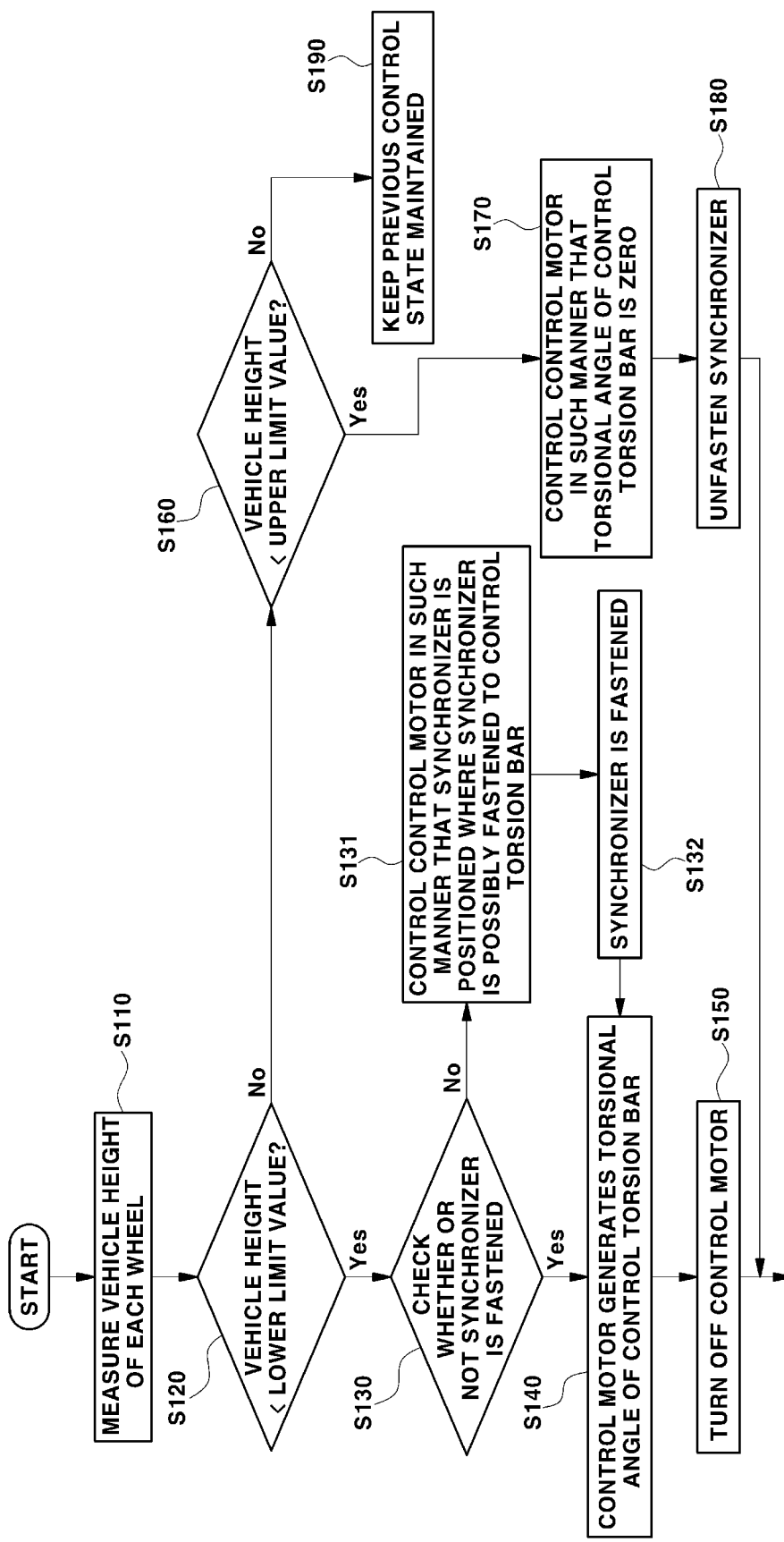
FIG. 6 is a flowchart for vehicle-height control by the vehicle-height control system of the independent corner module according to the various exemplary embodiments of the present disclosure.

FIG. 6 is a flowchart for vehicle-height control by the vehicle-height control system of the independent corner module according to the various exemplary embodiments of the present disclosure.

With reference to FIG. 6, the controller 500 may be configured to control the torsional stiffness of the control torsion bar 300 by controlling the torsion variation unit 400 in a case where a predetermined condition is satisfied. When receiving a signal below a preset lower limit value or a signal above a preset upper limit value from the sensor unit, the controller 500 may cause the synchronizer 430 to be connected to the control torsion bar 300 and may control the torsion variation unit 400 to adjust the vehicle height using the drive force of the control motor 410.

The sensor unit measures a wheel stroke value (vehicle height signal) of each wheel (S110) and transmits the vehicle height signal to the controller 500. The controller 500 may be configured to adjust the vehicle height using the vehicle-height control system of the independent corner module in a case where the vehicle height signal received from each wheel is below the predetermined reference value (S120). The controller 500 may be configured to compare the wheel stroke value of each wheel with preset upper and lower limit values that are stored in the controller 500. The preset upper and lower limit values of the vehicle height signal may be values that are set for the vehicle body 10 to smoothly pass over a road without any interference with a stone or the like on the road. The upper and lower limit values may be set so that varies with a type of vehicle and a usage condition.

In a case where the received vehicle height signal is below the preset lower limit value (S120), for the control motor 410 to adjust the torsional angles of both end portions of the control torsion bar 300 for the connection to the synchronizer 430, the controller 500 checks whether or not the synchronizer 430 is fastened (S130). In a state where the synchronizer 430 is fastened, the controller 500 is configured to control the synchronizer 430 to fasten the control torsion bar 300 and the control motor 410 to each other. Subsequently, the controller 500 drives the control motor 410 and generates the torsional angle of the control torsion bar 300 (S140). Furthermore, with the gear unit 200 which is fastened to the control torsion bar 300, the end portion of the suspension link 100 is moved in the heightwise direction. Therefore, control may be performed so that the vehicle height is adjusted according to the measured vehicle height. That is, in a case where the control motor 410 is driven to move the suspension link 100, the vehicle height may vary between the upper and lower limit values.

In contrast, in a case where the controller 500 determines that the synchronizer 430 is not in a fastened state (S130), the controller 500 is configured to control the control motor 410 so that the synchronizer 430 is positioned in a state of possibly being fastened to the control torsion bar 300 (S131). Subsequently, the synchronizer 430 is fastened (S132). The torsional angle is made with the control torsion bar 300 (S140) to which the drive force is applied from the control motor 410.

The controller 500 may perform control so that the control motor 410 no longer operates in a state where the torsional angle of the control torsion bar 300 is adjusted (S150). In a state where the control motor 410 stops being driven, the clutch unit 420 may prevent the back drive that results from the rotation force applied from the control torsion bar 300 to the control motor 410 and may keep the torsional stiffness of the control torsion bar 300 adjusted.

In contrast, in a case where the measured vehicle height is above the lower limit value (S120) and below the upper limit value (S160), the controller 500 is configured to control the control motor 410 so that the torsional angle of the control torsion bar 300 is zero (S170) and that the synchronizer 430 is unfastened (S180).

Furthermore, in the case where the measured vehicle height is above the lower limit value (S120) and below the upper limit value (S160), that is, in a case where the vehicle height signal between the preset lower and upper limit values is received, a previous control state is maintained (S190). That is, in a case where the measured vehicle height varies between the preset lower and upper limit values, the controller 500 may keep a previous control state maintained (S190). When receiving a signal that varies between the preset lower and upper limit values from the sensor unit in a state where the synchronizer 430 is controlled to be in a state of being connected to the control torsion bar 300, the controller 500 may control the synchronizer 430 so that it is kept connected to the control torsion bar 300. In contrast, when receiving the signal between the preset lower and upper limit values from the sensor unit after the synchronizer 430 is controlled to be disconnected from the control torsion bar 300, the controller 500 keeps the synchronizer 430 disconnected from the control torsion bar 300, keeping the control torsion bar 300 freely rotated.

That is, in a case where the currently measured vehicle height varies between the present lower and upper limit values, the vehicle height is sufficiently adjusted only with the stationary torsion bar 220, and the control torsion bar 300 is kept freely rotated. Therefore, in a case where the preset vehicle height signal varies between the lower and upper limit values, the controller 500 may not perform vehicle height adjustment control with the control torsion bar 300.

In summary, according to the various exemplary embodiments of the present disclosure, vehicle height control may be performed to set the torsional angle of the stationary torsion bar 220 based on the vehicle height. Accordingly, the vehicle height may be adjusted.

Figure 7:
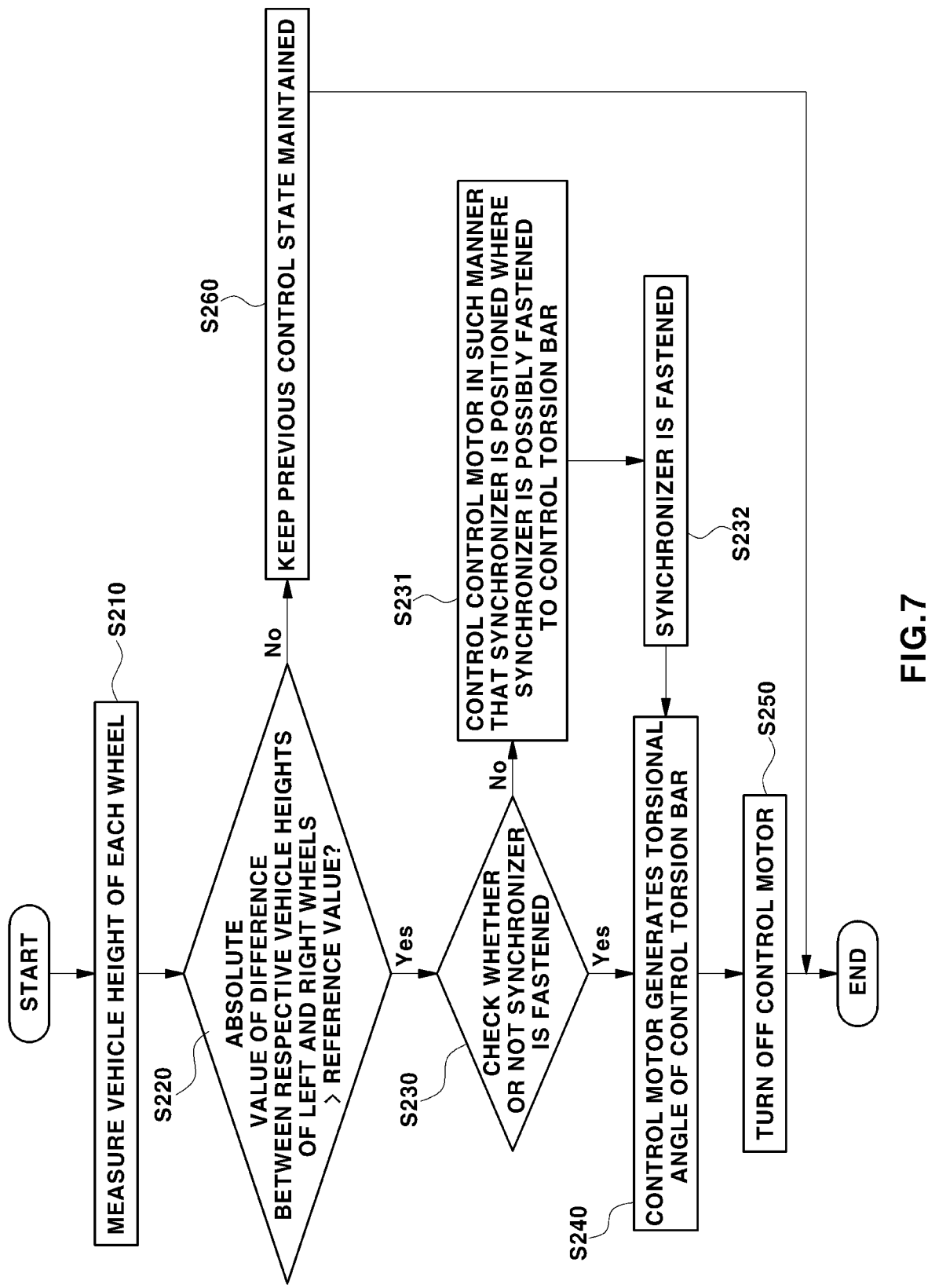
FIG. 7 is a flowchart for controlling roll behavior of the independent corner module according to the various exemplary embodiments of the present disclosure.

FIG. 7 is a flowchart for roll control by the vehicle-height control system of the independent corner module according to the various exemplary embodiments of the present disclosure. The controller 500 may be configured to perform the roll control by controlling the torsion variation unit 400 and thus generating the torsional angle of the control torsion bar 300. During roll behavior while the vehicle travels on a normal rough road, the controller 500 may induce the torsional stiffness of the control torsion bar 300 and may perform the roll control. When the independent corner module is pulled to one side due to quick turning, the controller 500 may stabilize behavior of the vehicle by inducing behavior of the control torsion bar 300 in the opposite direction thereof.

The sensor unit may measure the wheel stroke value of each wheel (S210). In the instant case, the sensor unit may be a yaw-rate sensor. In a case where an absolute value of a difference between respective vehicle heights of left and right wheels that are received from the sensor unit is higher than a predetermined reference value (S220), the controller 500 may perform control to compensate for the occurrence of roll. When the absolute value of the difference between the respective vehicle heights of the left and right wheels that are received from the sensor unit is equal to or lower than the predetermined reference value (S220), the controller 500 may keep the previous control state maintained (S260) without compensating for the occurrence of roll.

A step of adjusting, by the controller 500, the vehicle height for roll control includes a step of determining whether or not the synchronizer 430 is connected to the control torsion bar 300 (S230). In Step S230, in a state where the synchronizer 430 is fastened to the control torsion bar 300, the controller 500 may control the control motor 410 to make the torsional angle of the control torsion bar 300 to increase the vehicle height of the wheel on the lateral side of the vehicle which is relatively decreased (S240). Alternatively, the controller 500 may control the control motor 410 to generate the torsional angle of the control torsion bar 300 to decrease the vehicle height of the wheel on the lateral side of the vehicle which is relatively increased (S240).

After the torsional angle is adjusted as described above, the control motor 410 switches to an OFF state (S250).

In a step of performing, by the controller 500, compensation, in a case where it is determined that the synchronizer 430 is not connected to the control torsion bar 300 (S230), the controller 500 adjusts an angle of the control motor 410 so that fastening to the control torsion bar 300 is possible for the connection of the synchronizer 430 (S231), and thus, the control torsion bar 300 and the control motor 410 are connected to each other through the synchronizer 430 (S232). In a case where it is determined that the control torsion bar 300 and the control motor 410 are connected to each other through the synchronizer 430, the controller 500 may control the control motor 410 to adjust the torsional angle of the control torsion bar 300 of the independent corner module which is positioned on one lateral surface of the vehicle (S270).

According to the various exemplary embodiments of the present disclosure, the sensor unit may be positioned on each of the independent corner modules that are fastened to wheels, respectively, and may be positioned on both sides, that is, the left and right sides of the wheel. The sensor unit may be a yaw-rate sensor or a vehicle height sensor.

In summary, according to an exemplary embodiment of the present disclosure, the vehicle height may be controlled by controlling the torsional stiffness of the separate control torsion bar 300 according to a load state of the vehicle. Thus, in a case where a significant difference occurs in load, flexible control of the vehicle height may be performed, and at the same time, roll may be controlled by controlling a relative torsional angle of the control torsion bar 300. Therefore, there is provided the vehicle-height control system of the independent corner module which is configured for improving traveling stability and riding comfortability of the vehicle at the same time by adjusting a suspension state of the vehicle body 10 that varies according to the traveling state of the vehicle.

The present disclosure are described in detail above in an exemplary manner. Furthermore, the exemplary embodiments of the present disclosure are referred to as being sufficiently specific to enable one skilled in the art to practice the present disclosure, and various different modifications to the exemplary embodiments of the present disclosure and various different combinations thereof may possibly be made under various conditions. A modification or alteration to the exemplary embodiments of the present disclosure, as included in the present specification, of the present disclosure would possibly be made within the scope of the concept of the present disclosure, the scope of equivalents of the included contents, and/or the scope of the technology or knowledge in the art. The exemplary embodiments are described above to provide an essential requirement for realizing the technical idea of the present disclosure, and various modifications, which are required in a field of the present disclosure in which the present disclosure finds application, may also be made to the exemplary embodiments of the present disclosure. Therefore, the exemplary embodiment of the present disclosure, as disclosed in detail above, of the present disclosure are not intended to impose any limitation on the present disclosure. Furthermore, the following claims should be construed as covering other embodiments as well.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle-height control system of an independent corner module, the vehicle-height control system comprising:
   a suspension link, a first end portion thereof being connected to a wheel and a second end portion thereof being rotatably coupled to a vehicle body;
   a stationary torsion bar, a first end portion thereof being fixed to the vehicle body and a second end portion thereof being gear-engaged with the second end portion of the suspension link;
   a control torsion bar, a first end portion thereof being gear-engaged with the second end portion of the stationary torsion bar; and
   a torsion variation unit removably connected to a second end portion of the control torsion bar.

2. The vehicle-height control system of claim 1, wherein the torsion variation unit is configured to cause torsional stiffness of the control torsion bar to vary.

3. The vehicle-height control system of claim 2, wherein the torsion variation unit includes:
   a control motor configured to adjust a relative torsional angle between the first end portion and the second end portion of the control torsion bar;
   a clutch unit engaged to the control motor and configured to keep the control torsion bar twisted even in a state where the control motor is not driven; and
   a synchronizer configured to removably fasten a clutch-unit output shaft of the clutch unit and the second end portion of the control torsion bar to each other.

4. The vehicle-height control system of claim 3, wherein the clutch unit includes:
   a plurality of lockers, positioned inside a housing surrounding the clutch unit output shaft connected to the synchronizer;
   a control-motor rotation shaft, a first end portion of which is connected to the control motor and a second end portion of which is inserted into an opening portion formed in each of the lockers,
   wherein the clutch-unit output shaft is configured so that flat surfaces thereof are brought into contact with adjacent lockers when a rotation force of the control-motor rotation shaft is applied thereto so that the lockers and the clutch-unit output shaft are selectively brought into surface-contact with each other.

5. The vehicle-height control system of claim 3, further including:
   a controller electrically connected to the torsion variation unit and configured to control the torsion variation unit.

6. The vehicle-height control system of claim 5, wherein the controller is further configured to control the torsion variation unit so that the torsional stiffness of the control torsion bar varies according to a change in a vehicle height.

7. The vehicle-height control system of claim 6, wherein, when the vehicle height of each wheel of the vehicle is below a preset lower limit value, the controller is further configured to control the control motor so that the clutch-unit output shaft and the control torsion bar are fastened to each other through the synchronizer and that the relative torsional angle between the first end portion and the second end portion of the control torsion bar is adjusted.

8. The vehicle-height control system of claim 7, wherein, when the clutch-unit output shaft of the clutch unit and the control torsion bar are fastened to each other through the synchronizer, the controller is further configured to control the control motor so that the synchronizer is positioned to be fastened to the control torsion bar.

9. The vehicle-height control system of claim 6, wherein, when the vehicle height of each wheel of the vehicle varies between a present lower limit value and a preset upper limit value, the controller is further configured to keep a previous control state maintained.

10. The vehicle-height control system of claim 6, wherein, when the vehicle height of each wheel of the vehicle is above a preset upper limit value, the controller is further configured to cause the clutch-unit output shaft of the clutch unit and the control torsion bar to be separated from each other through the synchronizer.

11. The vehicle-height control system of claim 10, wherein, when the clutch-unit output shaft and the control torsion bar are separated from each other through the synchronizer, the controller is further configured to control the control motor so that the relative torsional angle between the first end portion and the second end portion of the control torsion bar is 0.

12. The vehicle-height control system of claim 3, wherein a controller is configured to control the torsion variation unit so that the torsional stiffness of the control torsion bar varies according to roll behavior of a vehicle.

13. The vehicle-height control system of claim 12, wherein when an absolute value of a difference between respective vehicle heights of left and right wheels in the vehicle is higher than a predetermined reference value, the controller is configured to control the control motor so that the clutch-unit output shaft and the control torsion bar are fastened to each other through the synchronizer and that the relative torsional angle between the first end portion and the second end portion of the control torsion bar is adjusted.

14. The vehicle-height control system of claim 13, wherein, before the clutch-unit output shaft and the control torsion bar are fastened to each other through the synchronizer, the controller is configured to control the control motor so that the synchronizer is positioned to be fastened to the control torsion bar.

15. The vehicle-height control system of claim 12, wherein, when the absolute value of the difference between the respective vehicle heights of the left wheel and the right wheel is at or below the predetermined reference value, the controller is configured to keep a previous control state maintained.

16. A method of controlling the vehicle-height control system of claim 3, the method comprising:
    controlling, by a controller, the torsion variation unit so that the torsional stiffness of the control torsion bar varies according to a change in a vehicle height.

17. The method of claim 16,
    wherein, when the vehicle height of each wheel of the vehicle is below a preset lower limit value, the controller is configured to control the control motor so that the clutch-unit output shaft of the clutch unit and the control torsion bar are fastened to each other through the synchronizer and that the relative torsional angle between the first end portion and the second end portion of the control torsion bar is adjusted, wherein, when the vehicle height of each wheel varies between the preset lower limit value and a preset upper limit value, the controller is configured to keep a previous control state maintained, and wherein, when the vehicle height of each wheel is above the preset upper limit value, the controller is configured to cause the clutch-unit output shaft of the clutch unit and the control torsion bar to be separated from each other through the synchronizer.

18. A method of controlling the vehicle-height control system of claim 3, the method comprising:

controlling, by a controller, the torsion variation unit so that the torsional stiffness of the control torsion bar varies according to roll behavior of a vehicle.

19. The method of claim 18, wherein when an absolute value of a difference between respective vehicle heights of left and right wheels is higher than a predetermined reference value, the controller is configured to control the control motor so that the clutch-unit output shaft and the control torsion bar are fastened to each other through the synchronizer and that the relative torsional angle between the first end portion and the second end portion of the control torsion bar is adjusted.

20. The method of claim 18, wherein, when an absolute value of a difference between respective vehicle heights of left and right wheels is at or below a predetermined reference value, the controller is configured to keep a previous control state maintained.

* * * * *